(12) United States Patent
Kao (10) Patent No.: US 11,175,834 B2
(45) Date of Patent: Nov. 16, 2021

(54) DATA STORAGE DEVICE HAVING SELF-DESTRUCTION FUNCTION

(71) Applicant: INNODISK CORPORATION, New Taipei (TW)

(72) Inventor: Chih-Chieh Kao, New Taipei (TW)

(73) Assignee: Innodisk Corporation, New Taipei (TW)

(*) Notice: Subject to any disclaimer, the term of this patent is extended or adjusted under 35 U.S.C. 154(b) by 0 days.

(21) Appl. No.: 16/785,897

(22) Filed: Feb. 10, 2020

(65) Prior Publication Data

US 2020/0371697 A1 Nov. 26, 2020

(51) Int. Cl.
*G06F 3/06* (2006.01)
*G11C 16/30* (2006.01)
*G06F 21/55* (2013.01)

(52) U.S. Cl.
CPC .......... *G06F 3/0623* (2013.01); *G06F 3/0659* (2013.01); *G06F 3/0679* (2013.01); *G06F 21/554* (2013.01); *G11C 16/30* (2013.01); *G06F 2221/034* (2013.01); *G06F 2221/2143* (2013.01)

(58) Field of Classification Search
CPC .......... G11C 16/22; G11C 7/24; G11C 16/30; G11C 5/141; G06F 2221/034; G06F 3/0632; G06F 21/554; G06F 3/0679; G06F 2221/2143; G06F 3/0623; G06F 21/79; G06F 3/062; G06F 3/0659; Y04S 40/20

USPC ....................................................... 711/103
See application file for complete search history.

(56) References Cited

U.S. PATENT DOCUMENTS

| | | | | |
|---|---|---|---|---|
| 5,319,765 A | * | 6/1994 | Kimura | G06F 21/79 711/164 |
| 2005/0259469 A1 | * | 11/2005 | Salessi | G11C 16/225 365/185.18 |
| 2011/0131649 A1 | * | 6/2011 | Lang | G06F 21/79 726/19 |

FOREIGN PATENT DOCUMENTS

| | | |
|---|---|---|
| GN | 202512645 U | 10/2012 |
| TW | M537294 U | 2/2017 |
| TW | 201812593 A | 4/2018 |

* cited by examiner

*Primary Examiner* — David Yi
*Assistant Examiner* — Zubair Ahmed
(74) *Attorney, Agent, or Firm* — Rosenberg, Klein & Lee (57) ABSTRACT

A data storage device having self-destruction function is disclosed. The data storage device is inserted into a host and includes a controller, a plurality of flash memories, a trigger, and a backup power module. When the data storage device is pulled out of the host, the trigger is triggered and transmits a physical-destruction activating signal to the backup power module, and the backup power module outputs a high voltage to the flash memories according to the physical-destruction activating signal so that the flash memories can be destroyed by the high voltage.

11 Claims, 9 Drawing Sheets

DATA STORAGE DEVICE HAVING SELF-DESTRUCTION FUNCTION

This non-provisional application claims priority claim under 35 U.S.C. § 119(a) on Taiwan Patent Application No. 108118035 filed May 24, 2019, the entire contents of which are incorporated herein by reference.

FIELD OF THE INVENTION

The present invention relates to a data storage device, more particularly, to a data storage device that is capable of self-executing physical destruction when being removed from a host.

BACKGROUND

Generally, data storage devices like solid-state drive (SSD), secure digital memory card (SD card), compact flash (CF) and flash drive are used to store confidential and important information, for example: financial data, military information and etc. Most of confidential information is also encrypted to prevent the data from being duplicated.

Currently, incidents of military or financial data being stolen occur quite often. When the thief wants to steal confidential data in a data storage device, he could just pull out the data storage device directly from a computer host first, and then insert the data storage device into another computer host to read the data storage device and decode the encrypted confidential data. At last, the thief successfully obtains and accesses the confidential data in the data storage device.

In view of this, the present invention provides a data storage device having self-destruction function, which is capable of activating self-destruction function to destroy a data storage element in the data storage device when the data storage device is removed from a computer host, thereby achieving the object of preventing the information stored in the data storage device from theft.

SUMMARY

An object of the invention is to provide a data storage device which can be facilitated in a host and includes a plurality of flash memories. When the data storage device is pulled out from the host, the data storage device will activate a self-destruction function to output a high voltage to the flash memories, and thus the flash memories will be destroyed by the high voltage. Hence, when an unauthorized person pulls the data storage device out from the host, the data storage device will automatically execute the destruction of the flash memories to prevent the leakage of important data stored in the flash memories.

Another object of the invention is to provide a data storage device that includes a trigger. The data storage device utilizes the trigger to send and receive signals to and from a host for detecting whether a closed loop exists between the data storage device and the host. When the closed loop between the data storage device and the host cannot be detected, it is determined that the data storage device has been pulled out from the host, and the data storage device will execute a self-destruction procedure.

Another object of the invention is to provide a data storage device that includes a trigger having a signal input end. When the data storage device is inserted into a host, the signal input end of the trigger is grounded via the host. When the data storage device detects that the signal input end of the trigger is ungrounded, it is determined that the data storage device has been pulled out from the host such that the data storage device will execute a self-destruction procedure.

Another object of the invention is to provide a data storage device that includes a microswitch having a switch lever. When the data storage device is inserted into a host having a baffle board, the switch lever of the microswitch pushes against the baffle board and therefore is pressed, and the data storage device will be prohibited to activate a self-destruction procedure. On the contrary, when the data storage device is pulled out from the host, the switch lever of the microswitch will be released from the baffle board, and the data storage device will execute the self-destruction procedure.

Another object of the invention is to provide a data storage device that is disposed in an external box and is a portable or removable data storage device. The data storage device includes a microswitch having a switch lever, wherein the microswitch is disposed in the external box and the switch lever of the microswitch protrudes out from a case of the external box. The external box includes an external connector. The host includes a slot having a host end connector. When the external box is pushed into the slot of the host, the external connector of the external box is inserted into the host end connector, the switch lever of the microswitch pushes against a bottom board of the slot and therefore is pressed, and thereby the data storage device will be prohibited to activate a self-destruction procedure. On the contrary, when the external box is pulled out from the host, the switch lever of the microswitch will be released from the bottom plate of the slot, and the data storage device will execute the self-destruction procedure.

To achieve the aforementioned objects, the invention provides a data storage device having self-destruction function. The data storage device having self-destruction function, the data storage device comprising: a controller; a plurality of flash memories; a device end connector, wherein the data storage device is inserted into a host end connector of a host via the device end connector; a trigger; and a backup power module, wherein the controller is connected to the flash memories, the device end connector, the trigger, and the backup power module, respectively; wherein when the device end connector of the data storage device is pulled out from the host end connector of the host, the trigger is triggered and transmits a physical-destruction activating signal to the backup power module, and the backup power module outputs a high voltage to the flash memories according to the physical-destruction activating signal to destroy the flash memories.

In one embodiment of the invention, the backup power module includes a battery, a switch, and a boost converter. The trigger is connected to the battery set and the switch, and the boost converter is connected between the switch and the flash memories; wherein when the trigger transmits the physical-destruction activating signal to the backup power module, the switch is turned on according to the physical-destruction activating signal so that a discharge energy from the battery set is transmitted to the boost converter via the switch in turned on, and the boost converter outputs the high voltage to the flash memories.

In one embodiment of the invention, wherein the host end connector of the host comprises a first specific host end pin and a second specific host end pin connected to the first specific host end pin, the device end connector of the data storage device comprises a first specific device end pin corresponding to the first specific host end pin and a second specific device end pin corresponding to the second specific host end pin, the trigger comprises a signal input end and a signal output end, wherein the signal input end is connected to the first specific device end pin, and the signal output end is connected to the second specific device end pin; when the data storage device is inserted into the host end connector of the host via the device end connector, the first specific device end pin is electrically connected to the first specific host end pin, the second specific device end pin is electrically connected to the second specific host end pin, and a closed loop is formed between the signal output end, the second specific device end pin, the second specific host end pin, the first specific host end pin, the first specific device end pin, and the signal input end; if the trigger transmits a first level signal from the signal output end and receives the first level signal at the signal input end, a level state at the signal input end is a first level state, the trigger operates in a normal mode based on the first level state at the signal input end so as to prohibit the physical-destruction activating signal to be transmitted to the backup power module; and if the trigger transmits the first level signal from the signal output end but does not receive the first level signal at the signal input end, the level state at the signal input end changes from the first level state to a second level state, and the trigger operates in a trigger mode based on the second level state at the signal input end to transmit the physical-destruction activating signal to the backup module.

In one embodiment of the invention, wherein the host end connector of the host comprises a first specific host end pin that is grounded, the device end connector of the data storage device comprises a first specific device end pin corresponding to the first specific host end pin, the trigger is a trigger triggered by a signal with high-level and comprises a signal input end connected to a power supply and the first device end pin, respectively; when the data storage device is inserted into the host end connector via the device end connector, the signal input end is grounded via the first specific device end pin and the first specific host end pin, a level state at the signal input end is pulled down by the grounding to a low-level state, and the trigger operates in a normal mode based on the low-level state at the signal input end so that the trigger is prohibited to transmit the physical-destruction activating signal to the backup power module; and when the device end connector of the data storage device is pulled out from the host end connector of the host, the level state at the signal input end is pulled up by the power supply to a high-level state, and the trigger operates in a trigger mode based on the high-level state at the signal input end so that the trigger will transmit the physical-destruction activating signal to the backup power module.

In one embodiment of the invention, further comprising a microswitch that is disposed beside the device end connector, and comprising a switch lever, a common terminal, a normally closed terminal, and a normally open terminal; wherein the host further comprises a baffle board disposed beside the host end connector, the trigger is a trigger triggered by a signal with low-level and comprises a signal input end, the common terminal is connected to the signal input end and a power supply, the normally closed terminal is grounded, the normally open terminal is open circuit; when the device end connector of the data storage device is inserted into the host end connector of the host, the switch lever of the microswitch is pushed against the baffle board and therefore is pressed, the common terminal is switched to be connected to the normally open terminal, a level state at the signal input end is pulled up by the power supply to a high-level state, and the trigger operates in a normal mode based on the high-level state at the signal input end so that the trigger is prohibited to transmit the physical-destruction activating signal to the backup power module; and when the device end connector of the data storage device is pulled out from the host end connector of the host, the switch lever is released from the baffle board such that the common terminal is switched to be connected to the normally closed terminal, the signal input end is grounded via the common terminal and the normally closed terminal, the level state at the signal input end is pulled down by the grounding to a low-level state, the trigger operates in a trigger mode based on the low-level state at the signal input end so that the trigger transmits the physical-destruction activating signal to the backup power module.

In one embodiment of the invention, further comprising a microswitch that is disposed beside the device end connector, and comprising a switch lever, a common terminal, a normally closed terminal, and a normally open terminal; wherein the host further comprises a baffle board disposed beside the host end connector, the trigger comprises a signal input end and is a trigger triggered by a signal with high-level, the common terminal is connected to the signal input end and a power supply, the normally closed terminal is open circuit, and the normally open terminal is grounded; when the device end connector is inserted into the host end connector of the host, the switch lever of the microswitch pushes against the baffle board and therefore is pressed, the common terminal is switched to be connected to the normally open terminal, the signal input end is grounded via the common terminal and the normally open terminal, a level state at the signal input end is pulled down by the grounding to a low-level state, and the trigger operates in a normal mode based on the low-level state at the signal input end so that the trigger is prohibited to transmit the physical-destruction activating signal to the backup power module; and when the device end connector of the data storage device is pulled out from the host end connector of the host, the switch lever is released from the baffle board, the common terminal is switched to be connected to the normally closed terminal, the level state at the signal input end is pulled up by the power supply to a high-level state, and the trigger operates in a trigger mode based on the high-level state at the signal input end so that the trigger transmits the physical-destruction activating signal to the backup power module.

In one embodiment of the invention, wherein the data storage device is disposed in an external box, the external box comprises an external connector electrically connected to the device end connector of the data storage device, the host comprises a slot in which the host end connector is disposed, the data storage device is inserted into the host end connector of the host via the external connector of the external box, and the device end connector of the data storage device is electrically connected to the host end connector of the host via the external connector of the external box; wherein when the external connector of the external box is pulled out from the host end connector in the slot of the host, the trigger is triggered to transmit the physical-destruction activating signal to the backup power module, and the backup power module outputs the high voltage to the flash memories according to the physical-destruction activating signal to destroy the flash memories.

In one embodiment of the invention, wherein the data storage device is disposed in an external box, the external box comprises an external connector electrically connected to the device end connector of the data storage device, the host comprises a slot in which the host end connector is disposed on a bottom plate thereof, the data storage device is inserted into the host end connector of the slot of the host via the external connector of the external box; the data storage device further comprises a microswitch that is disposed beside the external connector and comprising a switch lever, a common terminal, a normally closed terminal, and a normally open terminal; wherein the switch lever of the microswitch protrudes out from a case of the external box, the trigger is a trigger triggered by a signal with low-level and comprises a signal input end, the common terminal is connected to the signal input end and a power supply, the normally closed terminal is grounded, and the normally open terminal is open circuit; when the external box is pushed into the slot of the host and the external connector of the external box is inserted into the host device connector, the switch lever of the microswitch pushes against the bottom plate of the slot and therefore is pressed, the common terminal is switched to be connected to the normally open terminal, a level state at the signal input end is pulled up by the power supply to a high-level state, and the trigger operates in a normal mode based on the high-level state at the signal input end so that the trigger is prohibited to transmit the physical-destruction activating signal to the backup power module; and when the external connector of the external box is pulled out from the host end connector in the slot of the host, the switch lever is released from the bottom plate of the slot, the common terminal is switched to be connected to the normally closed terminal, the signal input end is grounded via the common terminal and the normally closed terminal, the level state at the signal input end is pulled down to a low-level state, and, the trigger operates in a trigger mode based on the low-level state at the signal input end so that the trigger transmits the physical-destruction activating signal to the backup power module.

In one embodiment of the invention, wherein the data storage device is disposed in an external box, the external box comprises an external connector electrically connected to the device end connector of the data storage device, the host comprises a slot in which the host end connector is disposed on a bottom plate thereof, the data storage device is inserted into the host end connector of the slot of the host via the external connector of the external box, the data storage device further comprises a microswitch that is disposed beside the external connector and comprising a switch lever, a common terminal, a normally closed terminal, and a normally open terminal; wherein the switch lever of the microswitch protrudes out from a case of the external box, the trigger is a trigger triggered by a signal with high-level and comprises a signal input end, the common terminal is connected to the signal input end and a power supply, the normally closed terminal is open circuit, and the normally open terminal is grounded; when the external box is pushed into the slot of the host and the external connector of the external box is inserted into the host end connector, the switch lever of the microswitch pushes against the bottom plate of the slot and therefore is pressed, the common terminal is switched to be connected to the normally open terminal, the signal input end is grounded via the common terminal and the normally open terminal, the level state at the signal input end is pulled down by the grounding to a low-level state, and the trigger operates in a normal mode based on the low-level state at the signal input end so that the trigger is prohibited to transmit the physical-destruction activating signal to the backup power module; and when the external connector of the external box is pulled out from the host end connector in the slot of the host, the switch lever is released from the bottom plate in the slot, the common terminal is switched to be connected to the normally closed terminal, the level state at the signal input end is pulled up by the power supply to a high-level state, and the trigger operates in a trigger mode based on the high-level state at the signal input end so that the trigger will transmit the physical-destruction activating signal to the backup power module.

In one embodiment of the invention, wherein the data storage device is powered by a system power and the backup power module is charged by the system power.

In one embodiment of the invention, wherein the backup power module supplies power to the trigger when the system power is powered off.

In one embodiment of the invention, wherein the trigger is a flip-flop.

In one embodiment of the invention, wherein the trigger is preset to a disabled state, wherein when the host transmits a security-protection activating command to the data storage device, the controller of the data storage device enables the trigger according to the security-protection activating command to activate the self-destruction function of the data storage device.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DETAILED DESCRIPTION OF THE PREFERRED EMBODIMENTS

Figure 1:
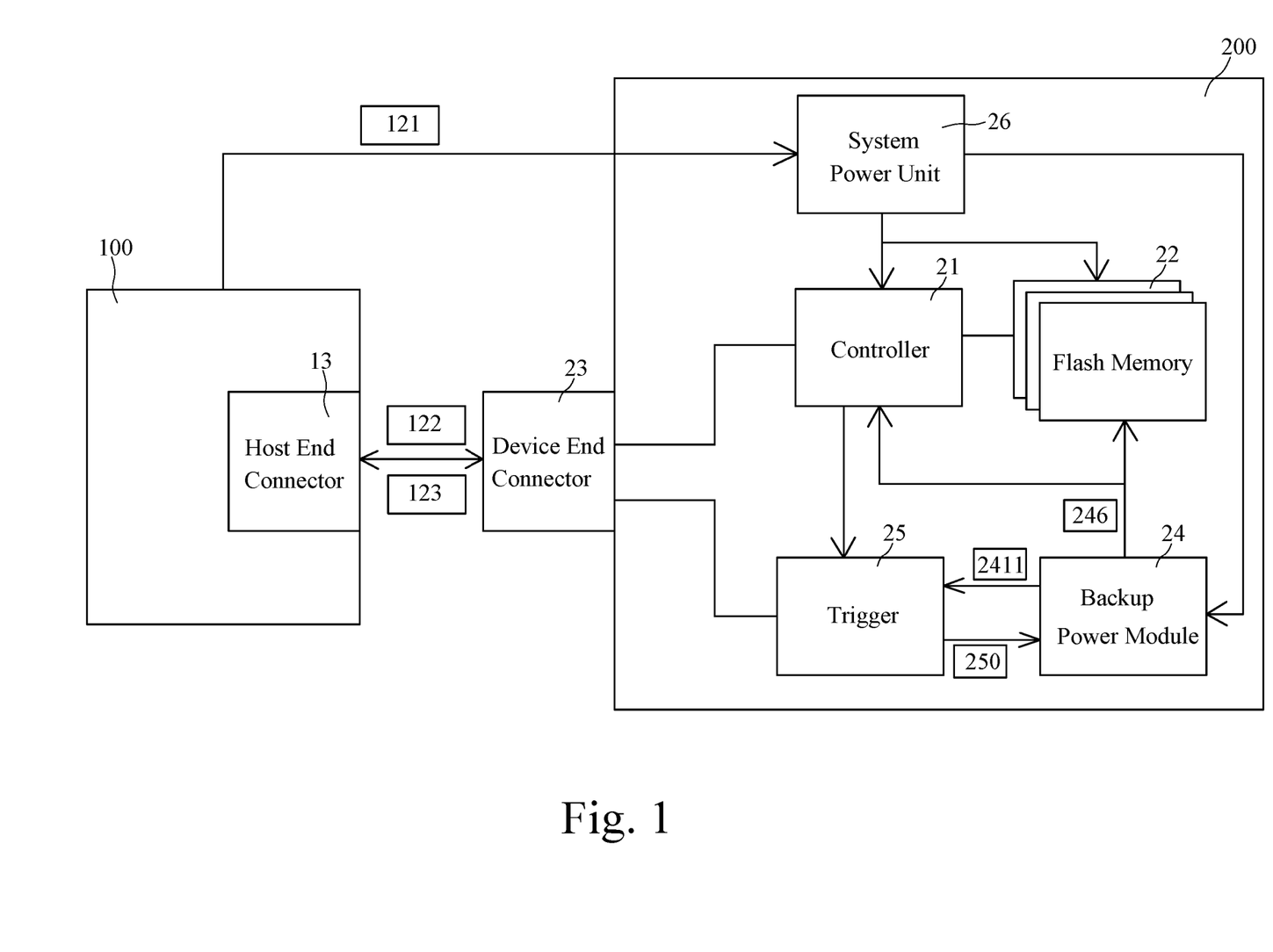
FIG. 1 is a circuit schematic diagram of a data storage device according to an embodiment of the invention.

Referring to FIG. 1, there is a circuit architecture diagram of a data storage device according to one embodiment of the present invention. As shown in FIG. 1, a data storage device 200 can be a solid-state drive (SSD) that is implemented in a host 100, like a computer host, as a medium in which the host 100 stores data.

The host 100 includes a host end connector 13. The data storage device 200 includes a controller 21, a plurality of flash memories 22, a device end connector 23, a backup power module 24, a trigger 25, and a system power unit 26. The controller 21 is connected to the flash memories 22, the device end connector 23, and the trigger 25, and the backup power module 24 is connected to the trigger 25. The data storage device 200 is inserted into the host end connector 13 of the host 100 via the device end connector 23, wherein the host 100 and the data storage device 200 can transmit data via the connectors 13, 23. The host end connector 13 and the device end connector 23 are the connectors conforming to SATA specification, PCIe specification, or USB specification. The trigger 25 is a circuit configured by a plurality of logic gates, like a flip-flop. The system power unit 26 is used to receive a system power 121 provided by the host 100 and transform the system power 121 to an operating voltage required by the data storage device 200 so that the operating voltage transformed by the system power unit 26 can be supplied to the controller 21, the plurality of flash memories 22, and the trigger 25, and used for charging the backup power module 24.

When the data storage device 200 is pulled out from the host end connector 13 of the host 100 by an unauthorized person, the trigger 25 will be triggered and therefore transmits a physical-destruction activating signal 250 to the backup power module 24. The backup power module 24 executes a physical destruction process according to the physical-destruction activating signal 250 to output a high voltage 246 to the controller 21 and the flash memories 22, and thus the controller 21 and the flash memories 22 are destroyed by the high voltage 246. In this invention, the high voltage 246 is a voltage much higher than the operating voltage of the data storage device 200.

Figure 2:
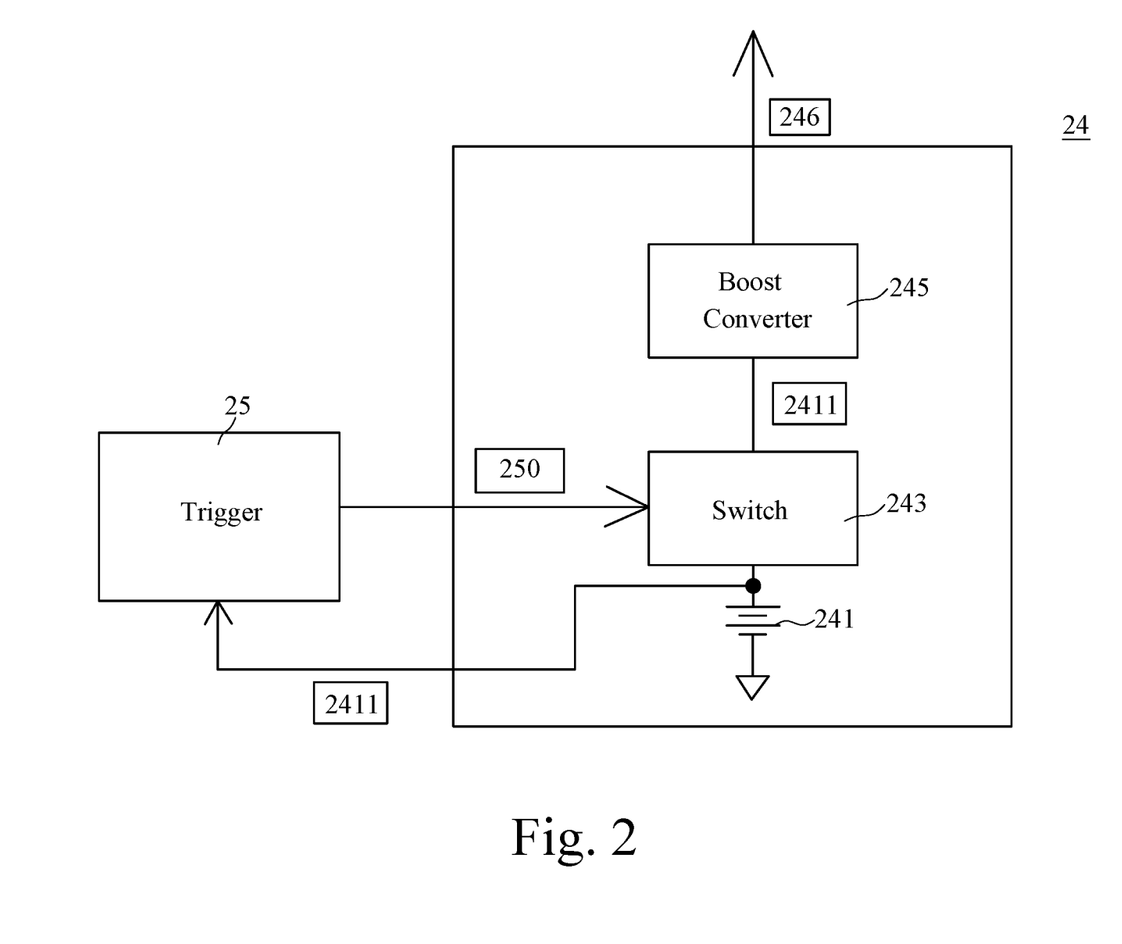
FIG. 2 is a circuit schematic diagram of a backup power module according to an embodiment of the invention.

Referring to FIG. 2, further, the backup power module 24 includes a battery set 241, a switch 243, and a boost converter 245, wherein the switch 243 is connected between the battery set 241 and the boost converter 245. While the host 100 is turned on and operating normally, the system power unit 26 charges the battery set 241 of the backup power module 24. When the backup power module 24 receives the physical-destruction activating signal 250 transmitted by the trigger 25, the switch 243 will be turned on by the physical-destruction activating signal 250 such that a discharge energy 2411 of the battery set 241 can be transmitted to the boost converter 245 via the switch 243 in turned on. The boost converter 245 boosts the discharge energy 2411 to generate the high voltage 246. The boost converter 245 outputs the high voltage 246 to the controller 21 and the flash memories 22 to destroy the controller 21 and the flash memories 22. In one embodiment of the invention, the switch 243 is designed to be an N-type metal-oxide-semiconductor field-effect transistor (NMOS) or a negative-positive-negative (NPN) type bipolar transistor, and the physical-destruction activating signal 250 is a high-level activating signal; in another embodiment of the invention, otherwise, the switch 243 is designed to be a P-type metal-oxide-semiconductor field-effect transistor (PMOS) or a positive-negative-positive (PNP) type bipolar transistor, and the physical-destruction activating signal 250 is a low-level activating signal.

In this invention, the trigger 25 is preset to a disabled state. When the data storage device 200 is configured in the host 100 for the first time, if the administrator of the data storage device 200 wants to proceed the security protection to the data stored in the data storage device 200, a security-protection activating procedure needs to be performed. Through the host 100, the administrator sends a security-protection activating command 122 to the data storages device 200. After receiving the security-protection activating command 122, the controller 21 of the data storage device 200 enables the trigger 25 to activate the self-destruction function of the data storage device 200. Only the enabled trigger 25 can accept an external trigger command for executing the physical destruction of the data storage device 200. On the other hand, when the administrator wants to pull the data storage device 200 from the host 100, the self-destruction function must be deactivated first. The administrator can send a security-protection deactivating command 123 to the data storage device 200 through the host 100. After receiving the security-protection deactivating command 123, the controller 21 of the data storage device 200 disables the trigger 25 so as to deactivate the self-destruction function of the data storage device 200. The disabled trigger 25 does not accept any trigger command.

Again, while the host 100 is operating normally, the system power unit 26 also provides the operating power to the trigger 25. The trigger 25 is kept in a working status for constantly monitoring whether the data storage device 200 is pulled out from the host 100. When the host 100 is shut down or the system power 121 is powered off, the backup power module 24 would provide the discharge energy 2411 to the trigger 25 to keep the trigger 25 in a standing-by status. Thus, even if the unauthorized person pulls the data storage device 200 out from the host 100 while the host 100 is shut down or has no power, the standing-by trigger 25 can still be triggered to execute the physical-destruction procedure and therefore destroy the controller 21 and the flash memories 22.

Figure 3:
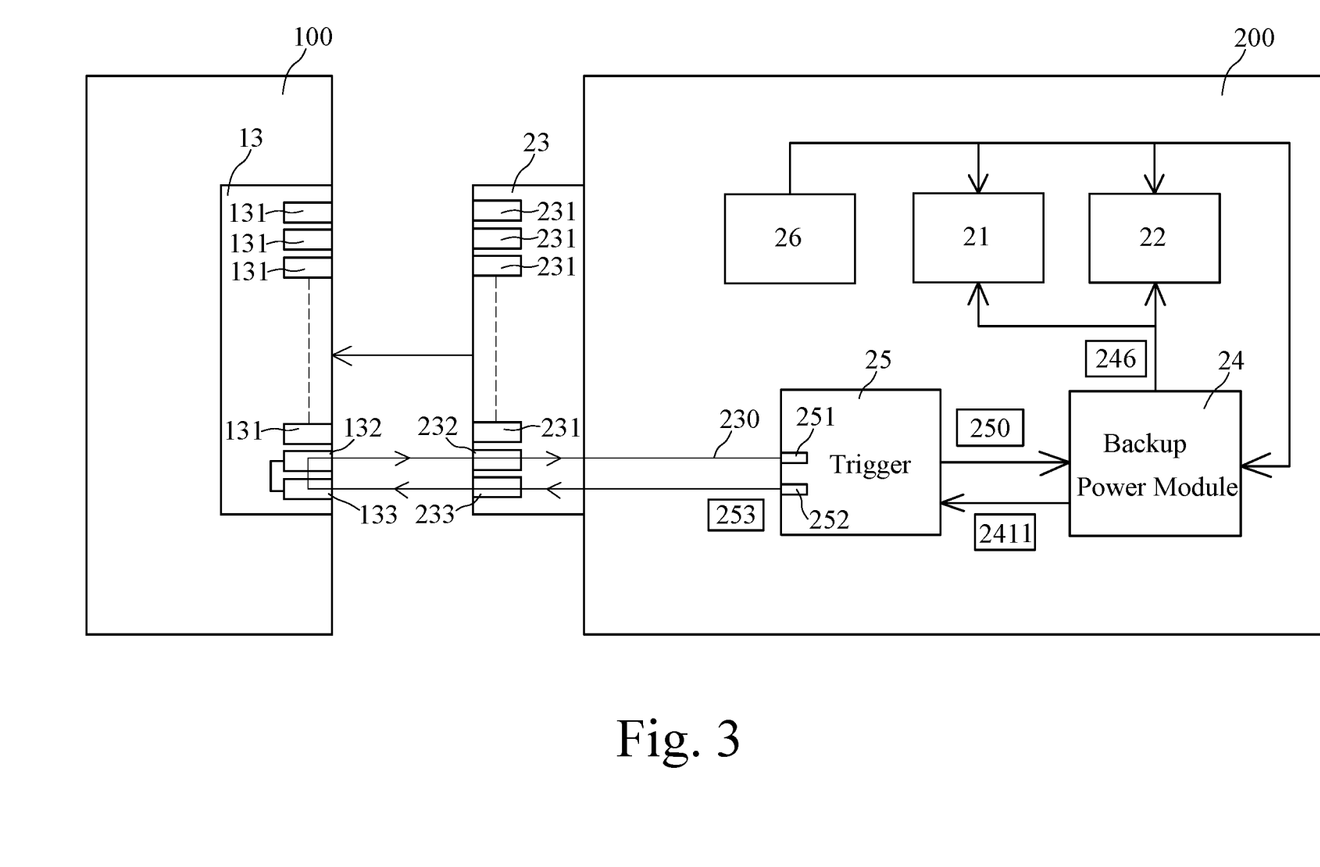
FIG. 3 is a circuit schematic diagram of a data storage device according to another embodiment of the invention.

Referring to FIG. 3, there is a circuit architecture diagram of a data storage device according to another embodiment of the present invention. As shown in FIG. 3, the host end connector 13 of the host 100 includes a plurality of host end pins 131, 132, 133, and the device end connector 23 of the data storage device 200 includes a plurality of device end pins 231, 232, 233. The host end pins 131 and the device end pins 231 are pins used for transmitting data, transmitting power energy, or grounding. The host end pins 132, 133 and the device end pins 232, 233 may be spare pins or unused pins. In this embodiment, the host end pin 132 and the host end pin 133 are defined as a first specific host end pin and a second specific host end pin, respectively, and the device end pin 232 and the device end pin 233 are defined as a first specific device end pin and a second specific device end pin, respectively. Besides, the first specific host end pin 132 is connected to the second specific host end pin 133.

The trigger 25 includes a signal input end 251 and a signal output end 252. The signal input end 251 is connected to the first specific device end pin 232, and the signal output end 252 is connected to the second specific device end pin 233. When the data storage device 200 is inserted into the host end connector 13 of the host 100 via the device end connector 23, the device end pins 231, the first specific device end pin 232, and the second specific device end pin 233 are electrically connected to the host end pins 131, the first specific host end pin 132, and the second specific host end pin 133, respectively, so that a closed loop 230 is formed between the signal output end 252, the second specific device end pin 233, the second specific host end pin 133, the first specific host end pin 132, the first specific device end pin 232, and the signal input end 251.

In this embodiment, the trigger 25 sends a first level signal 253, like a high-level signal, through the signal output end 252. If the device end connector 23 of the data storage device 200 is inserted into the host end connector 13 of the host 100, the first level signal 253 would be sent back to the trigger 25 via the closed loop 230. The trigger 25 receives the first level signal 253 sent back by the closed loop 230 at the signal input end 251, whereby a level state at the signal input end 251 is kept at the first level state, like the high-level state. The trigger 25 will operate in a normal mode based on the first level state at the signal input end 251, which prohibits transmission of the physical-destruction activating signal 250 to the backup power module 24. On the contrary, if the data storage device 200 is pulled out from the host 100, the signal input end 251 and the signal output end 252 of the trigger 25 are open circuits and the closed loop 230 will not exist, which causes that the signal input end 251 is unable to receive the first level signal 253 transmitted from the signal output end 252 via the closed loop 230 so that the level state at the signal input end 251 will be changed from the first level state to a second level state (Hi to Lo). The trigger 25 then operates in a trigger mode based on the second level state at the signal input end 251, wherein after being triggered, the trigger 25 would transmit the physical-destruction activating signal 250 to the backup power module 24 and the backup power module 24 would execute the physical-destruction procedure accordingly.

Therefore, the data storage device 200 detects whether the closed loop 230 exists between the date storage device 200 and the host 100 by utilizing the trigger 25 to transmit and receive signals to and from the host 100. When the data storage device 200 detects that the closed loop 230 does not exist, it indicates that the data storage device 200 has been pulled out from the host 100, and the data storage device 200 would execute the self-destruction procedure.

Figure 4:
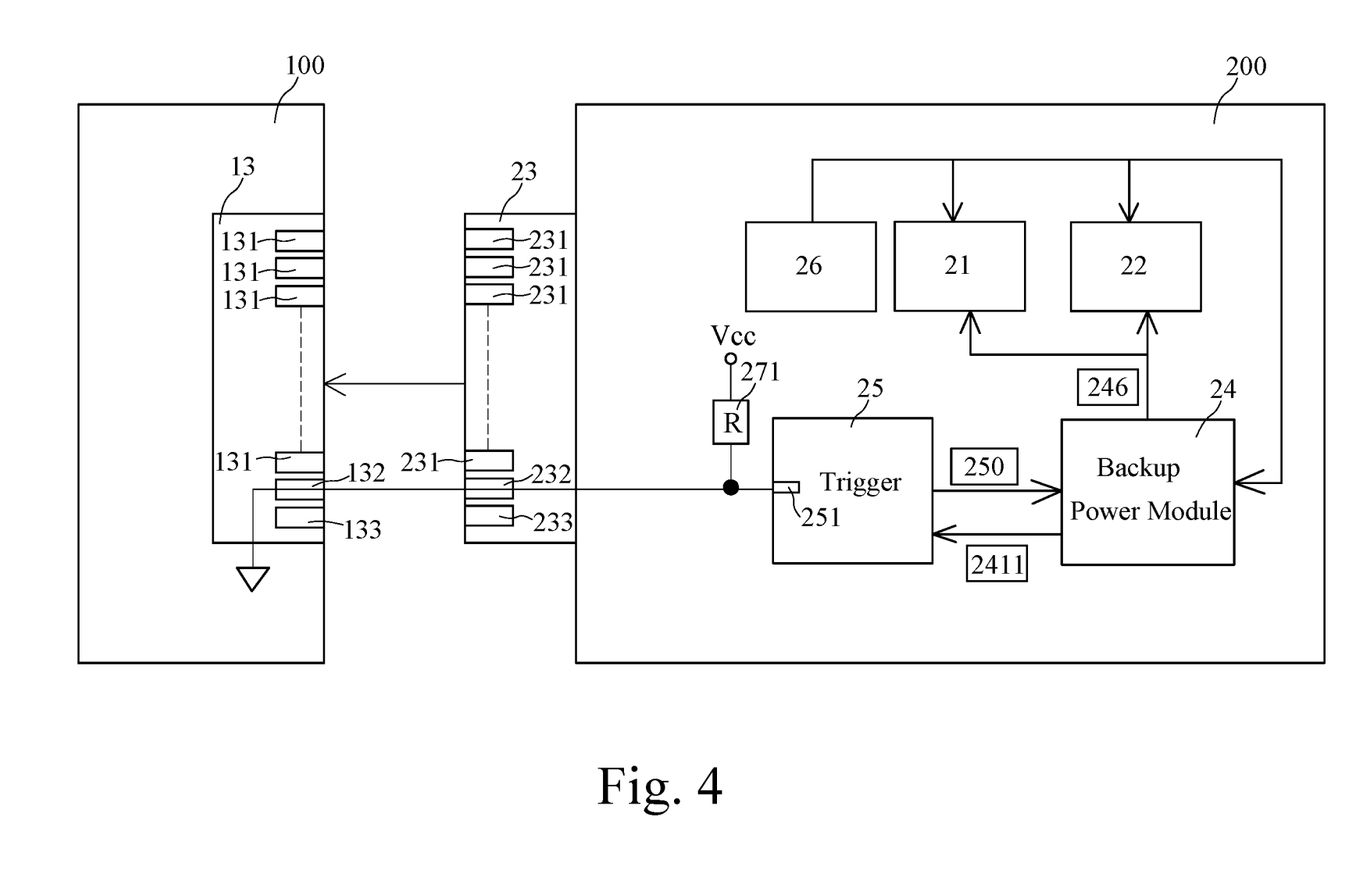
FIG. 4 is a circuit schematic diagram of a data storage device according to another embodiment of the invention.

Referring to FIG. 4, there is a circuit architecture diagram of a data storage device according to another embodiment of the present invention. As shown in FIG. 4, the host end connector 13 of the host 100 includes a plurality of host end pins 131, 132, 133, and the device end connector 23 of the data storage device 200 includes a plurality of device end pins 231, 232, 233. The host end pins 131 and the device end pins 231 are pins used for transmitting data, transmitting power energy, or grounding. The host end pins 132, 133 and the device end pins 232, 233 are spare pins or unused pins. In this embodiment, the host end pin 132 is defined as a first specific host end pin, and the device end pin 232 is defined as a first specific device end pin. Besides, the first specific host end pin 132 is grounded.

The trigger 25 in this embodiment is a trigger triggered by a signal with high-level and includes a signal input end 251. The signal input end 251 is connected to the first specific device end pin 232, and is connected to a power supply Vcc via a resistor 271. When the data storage device 200 is inserted into the host device connector 13 of the host 100 via the device end connector 23, the signal input end 251 is grounded via the first specific device end pin 232 and the first specific host end pin 132, and the level state at the signal input end 251 is pulled down to a low-level state. The trigger 25 operates in a normal mode based on the low-level state at the signal input end 251, which prohibits transmission of the physical-destruction activating signal 250 to the backup power module 24. On the contrary, when the device end connector 23 of the data storage device 200 is pulled out from the host end connector 13 of the host 100, the signal input end 251 is unable to be grounded via the first specific host end pin 132 of the host 100, and so the level state at the signal input end 251 is pulled up by the power supply Vcc to a high-level state. Based on the high-level state at the signal input end 251, the trigger 25 operates in a trigger mode, which will transmit the physical-destruction activating signal 250 to the backup power modules 24, so as to require the backup power module 24 to execute the physical-destruction procedure.

Hence, the data storage device 200 in this embodiment determines whether the signal input end 251 is grounded via the host 100 by detecting the signal level at the signal input end 251 of the trigger 25. When it is detected that the signal input end 251 of the trigger 25 is not be grounded via the host 100, the data storage device 200 is determined to have been pulled out from the host 100, and the data storage device 200 will execute the self-destruction procedure.

Figure 5:
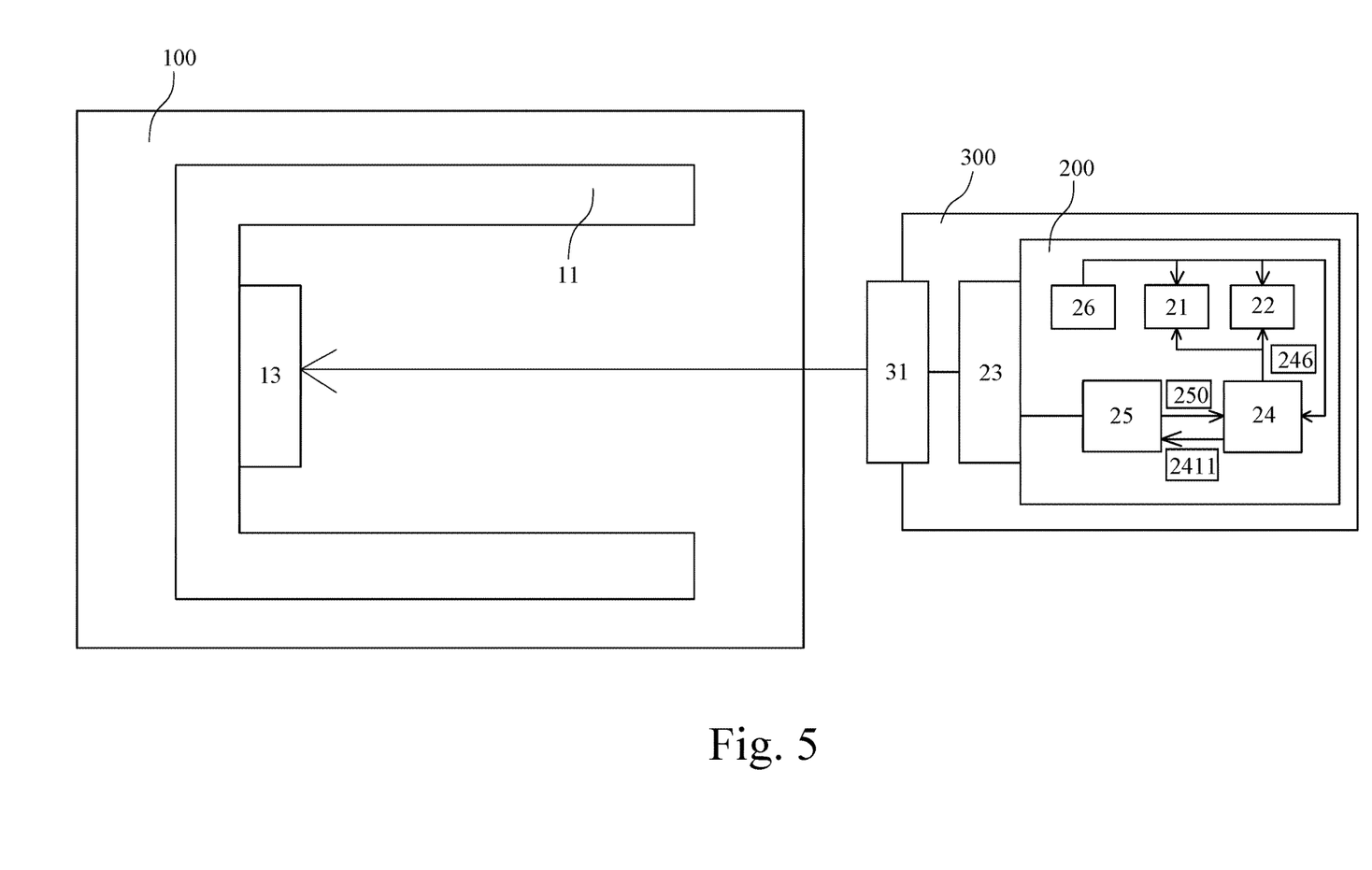
FIG. 5 is a circuit schematic diagram of a data storage device according to another embodiment of the invention.

Referring to FIG. 5, there is a circuit architecture diagram of a data storage device according to another embodiment of the present invention. As abovementioned, the data storage device 200 in FIG. 1, FIG. 3, and FIG. 4 is a built-in data storage device that is directly inserted into the host end connector 13. As shown in FIG. 5, the data storage device 200 in this embodiment is a portable or removable data storage device, which can be disposed in the host 100 through an external box 300.

The external box 30 includes an external connector 31. The data storage device 200 is disposed inside the external box 300 and the device end connector 23 of the data storage device 200 is electrically connected to the external connector 31 of the external box 300. The host 100 includes a slot 11 and the host end connector 13 is disposed at the bottom end of the slot 11. When the external box 300 is pushed to the bottom end of the slot 11, the external connector 31 may be inserted into the host end connector 13 of the slot 11, and thus the device end connector 23 of the data storage device 200 is electrically connected to the host end connector 13 of the host 100 via the external connector 31.

Similarly, the portable data storage device 200 is able to use the trigger 25 to detect whether the closed loop 230 exists between the data storage device 200 and the host 100 by transmitting and receiving signals to and from the host 100. When the closed loop 230 cannot be detected, the portable data storage device 200 is determined to have been pulled out from the host 100, and so the data storage device would execute the self-destruction procedure.

Or, the portable data storage device 200 determines whether the signal input end 251 of the trigger 25 is being grounded via the host 100 by detecting the signal level at the signal input end 251 of the trigger 25. When the signal input end 251 of the trigger 25 is not grounded via the host 100, the portable data storage device 200 is determined to have been pulled out from the host 100, and the data storage device would execute the self-destruction procedure.

Figure 6:
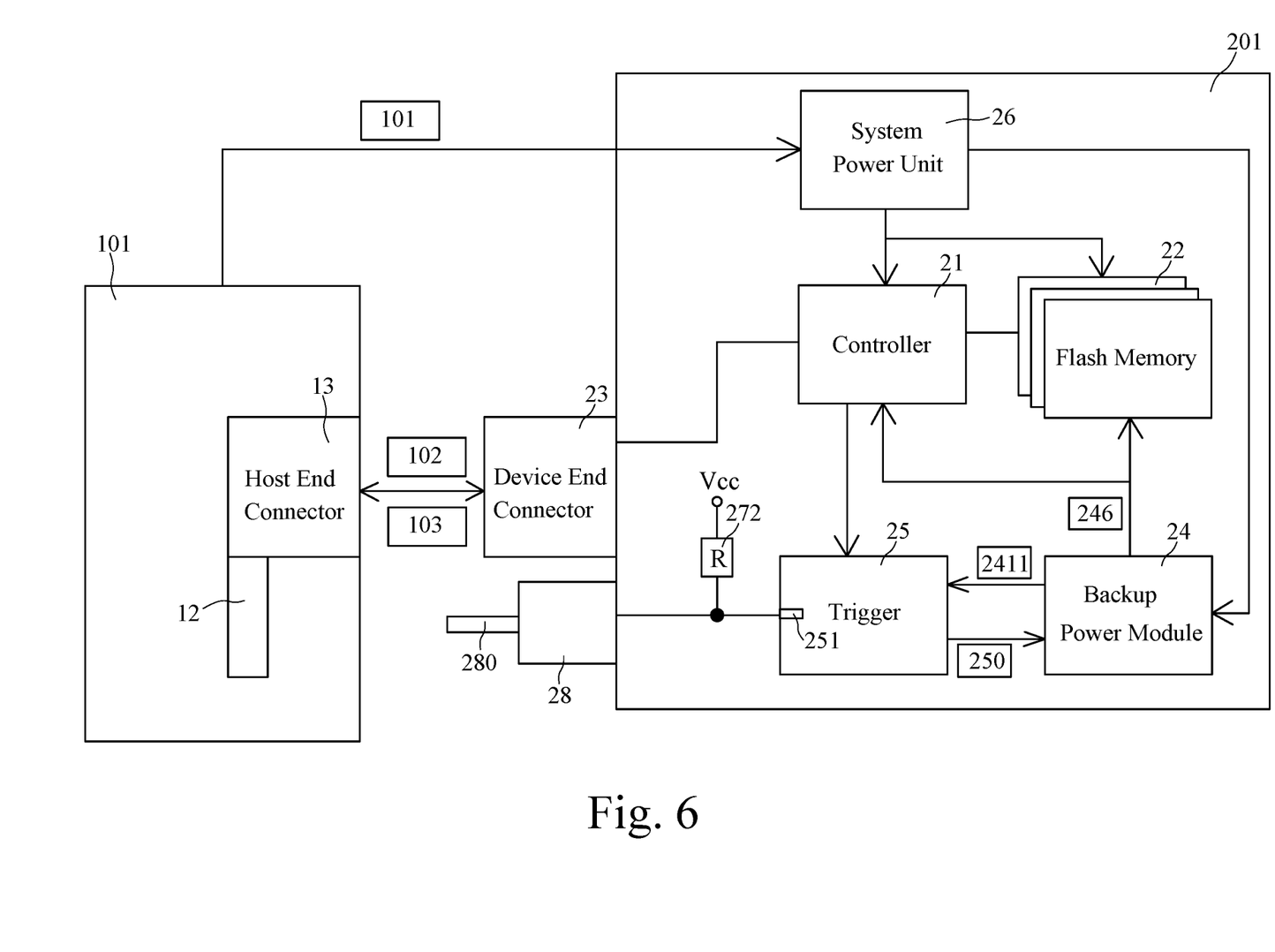
FIG. 6 is a circuit schematic diagram of a data storage device according to another embodiment of the invention.

Referring to FIG. 6, a data storage device 201 according to yet another embodiment of the invention further includes, in comparison to the data storage device 200 of FIG. 1, a microswitch 28. The microswitch 28 includes a switch lever 280 and is disposed beside the device end connector 23. Further, a host 101 of this embodiment further includes a baffle board 12 disposed beside the host end connector 13.

As well, the trigger 25 is preset to a disabled state. When the data storage device 201 is configured in the host 101 for the first time, the administrator of the data storage device 201 needs to perform a security-protection activating procedure if he wants to proceed the security protection to the data stored in the data storage device 201. Through the host 101, the administrator sends a security-protection activating command 122 to the data storage device 201. After receiving the security-protection activating command 122, the controller 21 of the data storage device 201 enables the trigger 25 to activate the self-destruction procedure of the data storage device 201. Only the enabled trigger 25 can accept the external trigger command for executing the physical destruction of the data storage device 201. On the other hand, before removing the data storage device 201 from the host 101, the administrator needs to deactivate the self-destruction function by issuing a security-protection deactivating command 123 to the data storage 201 through the host 101, and the controller 21 of the data storage device 201 disables the trigger 25 after receiving the security-protection deactivating command 123 so as to turn off or deactivate the self-destruction function of the data storage device 201. The disabled trigger 25 does not accept any trigger command.

Figure 7:
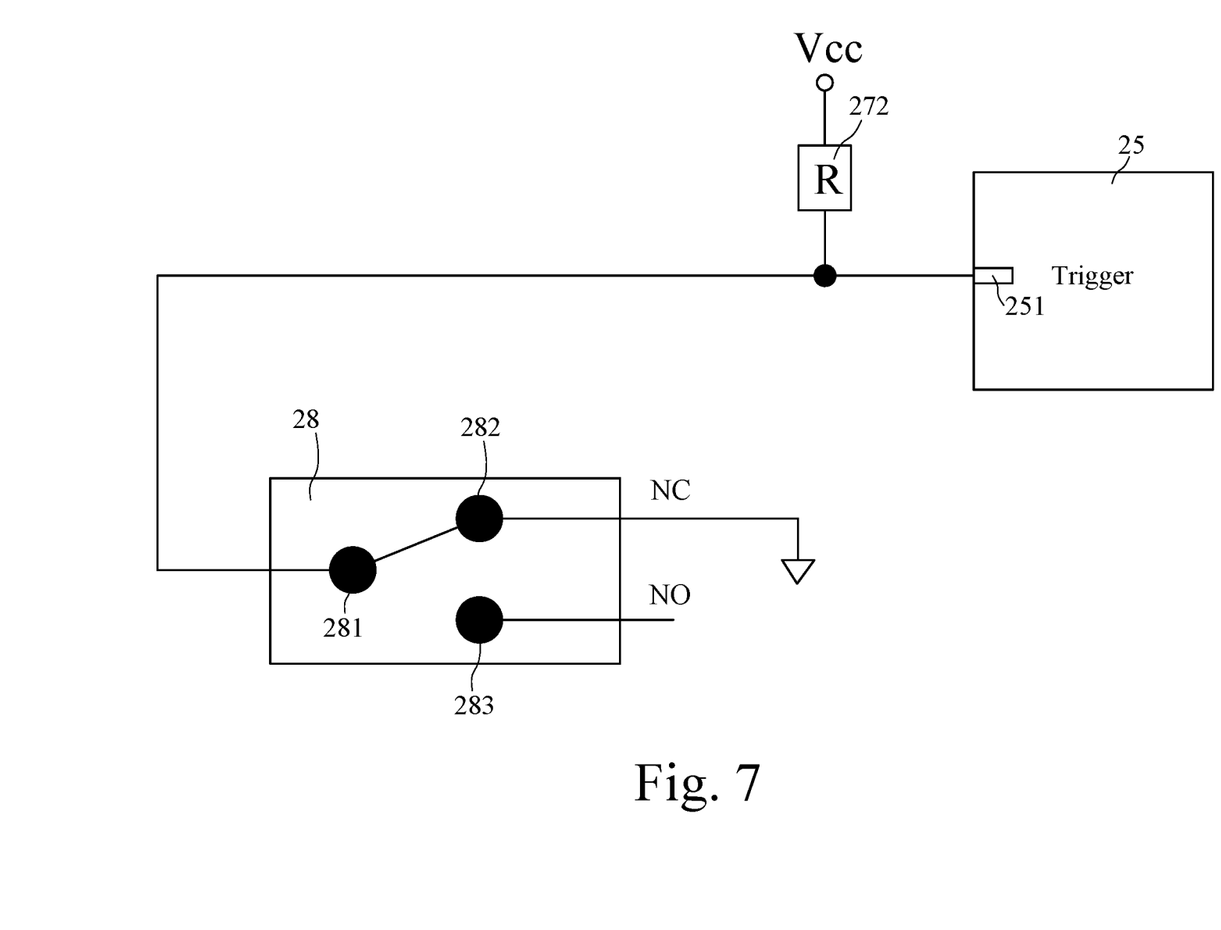
FIG. 7 is a schematic diagram of a microswitch according to an embodiment of the invention.

Next, in one embodiment of the invention, the trigger 25 is a trigger triggered by a signal with low-level. As shown in FIG. 7, the microswitch 28 includes a common terminal 281, a normally closed terminal 282, and a normally open terminal 283, wherein the common terminal 281 is connected to the signal input end 251, and is connected to the power supply Vcc via a resistor 272. The normally closed terminal 282 is grounded and the normally open terminal 283 is open circuit. By pressing or releasing the switch lever 280, the common terminal 281 is switched to be connected to the normally open terminal 283 or the normally closed terminal 282. When the device end connector 23 of the data storage device 201 is inserted into the host end connector 13 of the host 101, the switch lever 280 of the microswitch 28 pushes against the baffle board 12 and therefore is pressed, and so the common terminal 281 is connected to the normally open end 283. Subsequently, the level state at the signal input end 251 is pulled up by the power supply Vcc to a high-level state, and the trigger 25 operates in a normal mode based on the high-level state at the signal input end 251 such that the trigger 25 is prohibited to transmit the physical-destruction activating signal 250 to the backup power module 24. In contrast, when the device end connector 23 of the data storage device 201 is pulled out from the host end connector 13 of the host 101, the pressed switch lever 280 is released from the baffle board 12 and the common terminal 281 is switched to be connected to the normally closed terminal 282, whereby the signal input end 251 is grounded via the common terminal 281 and the normally closed terminal 282. Thus, the level state at the signal input end 251 is pulled down by the grounding to a low-level state, and based on the low-level state at the signal input end 251, the trigger 25 operates in a trigger mode, which transmits the physical-destruction activating signal 250 to the backup power module 24 and requires the backup power module 24 to execute the physical-destruction procedure.

Figure 8:
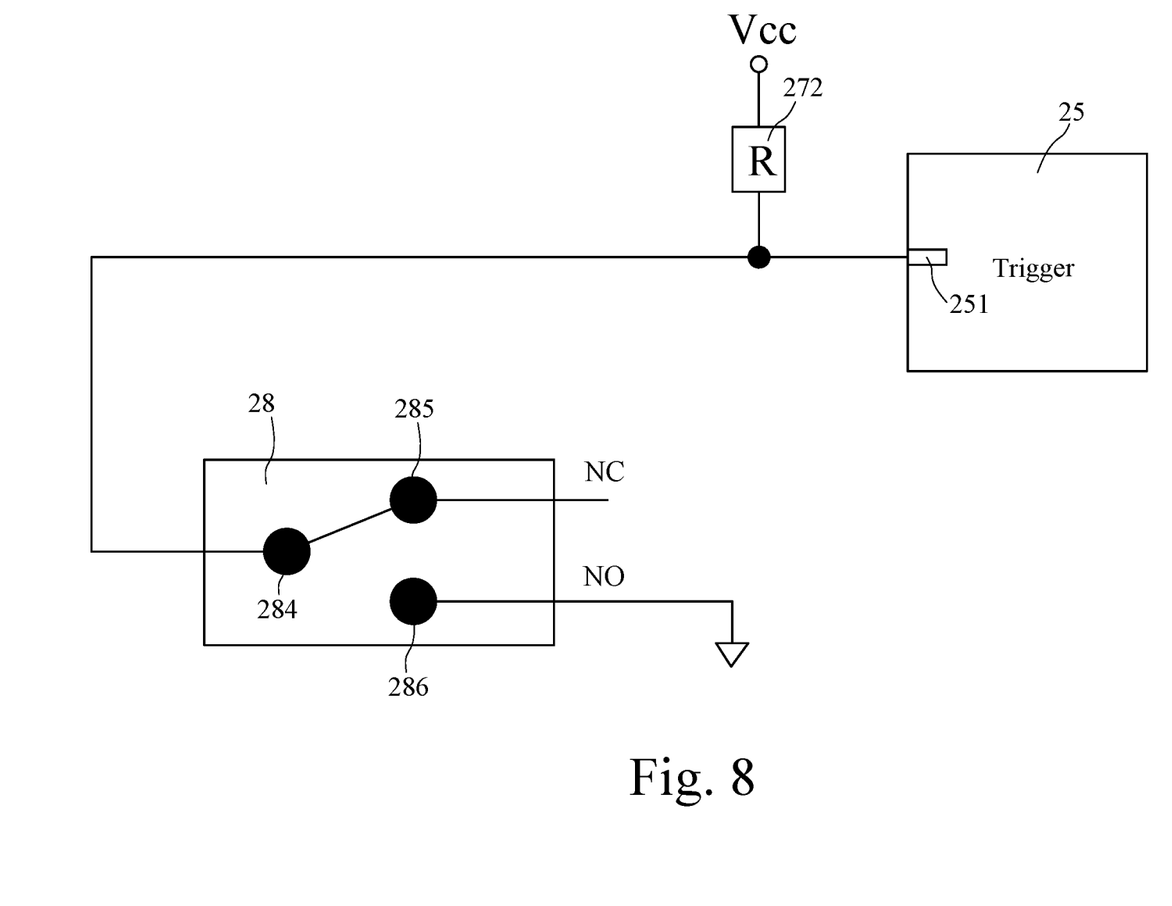
FIG. 8 is a schematic diagram of a microswitch according to another embodiment of the invention.

Moreover, in yet another embodiment of the invention, the trigger 25 is a trigger triggered by a signal with high-level. As shown in FIG. 8, the microswitch 28 includes a common terminal 284, a normally closed terminal 285, and a normally open terminal 286, wherein the common terminal 284 is connected to the signal input end 251, and is connected to the power supply Vcc via a resistor 272. The normally closed terminal 285 is open circuit and the normally open terminal 286 is grounded. By the pressing or releasing of the switch lever 280, the common terminal 284 is switched to be connected to the normally open terminal 286 or the normally closed terminal 285. When the device end connector 23 of the data storage device 201 is inserted into the host end connector 13 of the host 101, the switch lever 280 of the microswitch 28 pushes against the baffle board 12 and therefore is pressed, and so the common terminal 284 is connected to the normally open terminal 286, which in turn the signal input end 251 is grounded via the common terminal 284 and the normally open terminal 286. Thus, the level state at the signal input end 251 is pulled down by the grounding to a low-level state, and the trigger 25 operates in a normal mode based on the low-level state at the signal input end 251 to prohibit transmission of the physical-destruction activating signal 250 to the backup power module 24. On the contrary, when the device end connector 23 of the data storage device 201 is pulled out from the host end connector 13 of the of the host 101, the switch lever 280 that was pressed is released from the baffle board 12, and the common terminal 284 is switched to be connected to the normally closed terminal 285, wherein the level state at the signal input end 251 is pulled up by the power supply Vcc to a high-level state. The trigger 25 operates in a trigger mode based on the high-level state at the signal input end 251 to transmit the physical-destruction activating signal 240 to the backup power module 24, and thus the backup power module 24 executes the physical-destruction procedure according to the physical-destruction activating signal 240.

Therefore, the data storage device 201 in this embodiment can detect whether the data storage device 201 is pulled out from the host 101 by pressing or releasing the microswitch 28 and thereby determining whether to command the backup power module to execute the physical-destruction procedure.

Figure 9:
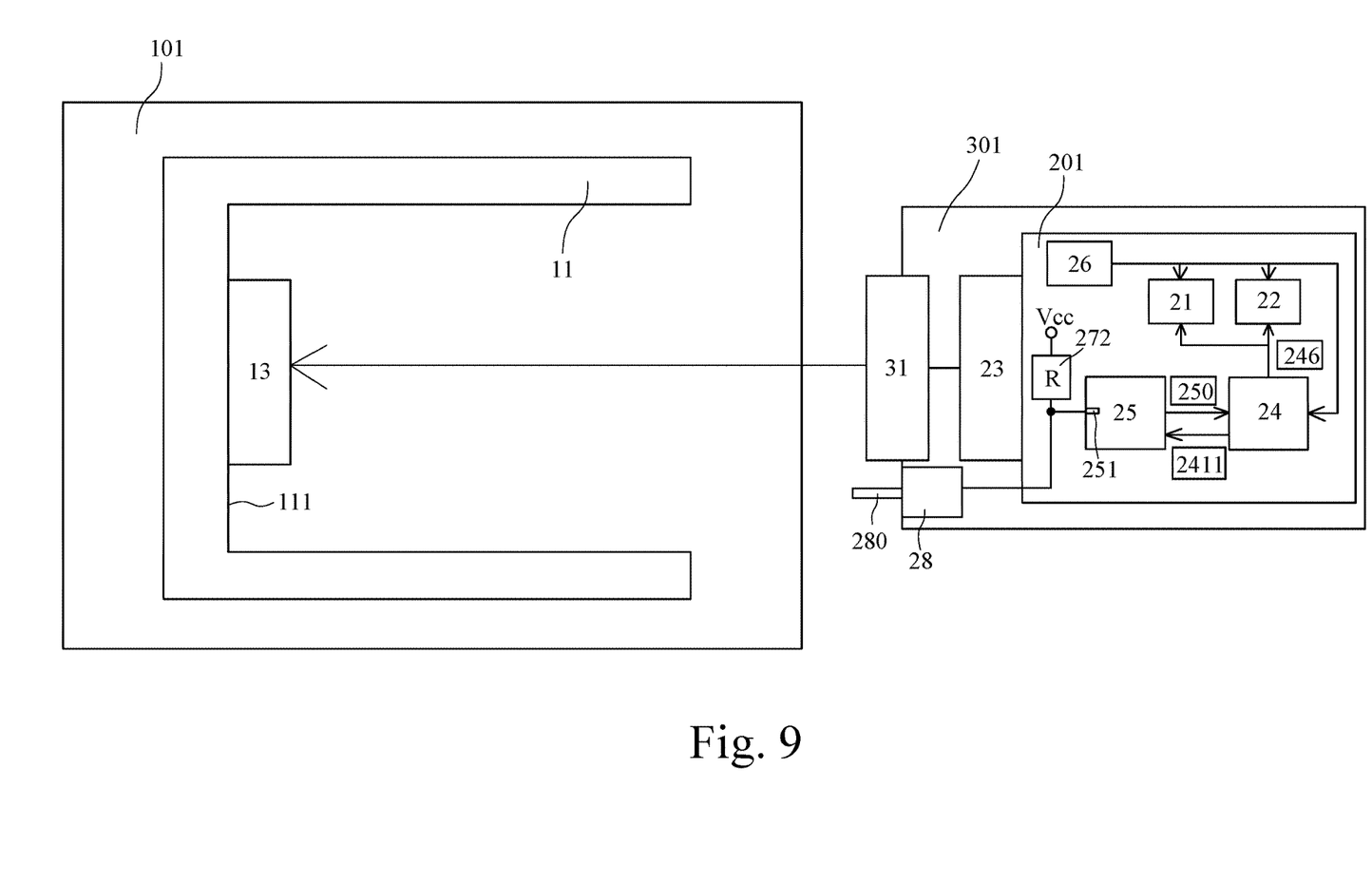
FIG. 9 is a circuit schematic diagram of a data storage device according to another embodiment of the invention.

FIG. 9 is a data storage device according to yet another embodiment of the invention. As aforementioned, the data storage device 201 of FIG. 6 is a built-in data storage device that is directly in connection with the host end connector 13 of the host 101. The data storage device 201 shown in FIG. 9 is a portable data storage device that is disposed in the host 101 through an external box 301.

The external box 301 includes an external connector 31. The data storage device 201 is disposed in the external box 301, and the device end connector 23 of the data storage device 201 is electrically connected to the external connector 31 of the external box 301. The host 101 includes a slot 11. The host end connector 13 is disposed on a bottom plate 111 of the slot 11. When the external box 301 is pushed to the end of the slot 11, the external connector 31 may be inserted into the host end connector 13 of the slot 11, and thus the device end connector 23 of the data storage device 201 is electrically connected to the host end connector 13 of the host 101 via the external connector 31.

Moreover, the microswitch 28 of the data storage device 201 is disposed beside the external connector 31, and the switch lever 280 of the microswitch 28 protrudes out from the case of the external box 301. When the external box 301 is pushed into the bottom end of the slot 11, the switch lever 280 of the microswitch 28 pushes against the bottom plate 111 of the slot 11 and therefore is pressed. Or, when the external box 301 is pulled out from the slot 11 of the host 101, the microswitch 28 is moved away from the bottom plate 111 of the slot 11 and the pressed switch lever 28 is released.

Referring to FIG. 7 and FIG. 9 at the same time, when the trigger 25 is a trigger triggered by a signal with low-level, if the external connector 31 of the external box 301 is steady inserted into the host end connector 13 of the host 101, the switch lever 280 of the microswitch 28 pushes against the bottom plate 111 of the slot 11 and therefore is pressed, and the common terminal 281 is connected to the normally open terminal 283; accordingly, the level state at the signal input end 251 is pulled up by the power supply Vcc to the high-level state, and the trigger 25 operates in the normal mode based on the high-level state at the signal input end 251 so as to prohibit transmission of the physical-destruction activating signal 250 to the backup power module 24. On the contrary, if the external box 301 is pushed out from the slot 11 of the host 101, the switch lever 280 that was pressed is released from the bottom plate 111, and the common terminal 281 is connected to the normally closed terminal 282, whereby the signal input end 251 is grounded via the common terminal 281 and the normally closed terminal 282. The level state at the signal input end 251 is thereby pulled down by the grounding to the low-level state, and the trigger 25 operates in the trigger mode based on the low-level state at the signal input end 251 to transmit the physical-destruction activating signal 250 to the backup power module 24 so that the backup power module 24 will execute the physical-destruction procedure.

Or, referring to FIG. 8 and FIG. 9 at the same time, when the trigger is a trigger triggered by a high-level signal, if the external connector 31 of the external box 301 is steady inserted into the host end connector 13 of the host 101, the switch lever 280 of the microswitch 28 pushes against the bottom plate 111 of the slot 11 and therefore is pressed, so the common terminal 284 is connected to the normally open terminal 286 such that the signal input end 251 is grounded via the common terminal 284 and the normally open terminal 286. The level state at the signal input end 251 is pulled down by the grounding to the low-level state and the trigger 25 operates in the normal mode based on the low-level state at the signal input end 251 to prohibit transmission of the physical-destruction activating signal 250 to the backup power module. On the other hand, when the external box 301 is pulled out from the slot 11 of the host 101, the switch lever 280 that was pressed would be released from the end plate 111, and thereby the common terminal 284 is connected to the normally closed terminal 285. The level state at the signal input end 251 is then pulled up by the power supply Vcc to the high-level state, the trigger 25 operates in the trigger mode based on the high-level state at the signal input end 251 to transmit the physical-destruction activating signal 250 to the backup power module 24, thereby commanding the backup power module 24 to execute the physical-destruction procedure.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A data storage device having self-destruction function, the data storage device comprising:
    a controller;
    a plurality of flash memories;
    a device end connector, wherein the data storage device is inserted into a host end connector of a host via the device end connector;
    a trigger; and
    a backup power module, wherein the controller is connected to the flash memories, the device end connector, the trigger, and the backup power module, respectively;
    wherein when the device end connector of the data storage device is pulled out from the host end connector of the host, the trigger is triggered and transmits a physical-destruction activating signal to the backup power module, and the backup power module outputs a high voltage to the flash memories according to the physical-destruction activating signal to destroy the flash memories;
    wherein the host end connector of the host comprises a first specific host end pin and a second specific host end pin connected to the first specific host end pin, the device end connector of the data storage device comprises a first specific device end pin corresponding to the first specific host end pin and a second specific device end pin corresponding to the second specific host end pin, the trigger comprises a signal input end and a signal output end, wherein the signal input end is connected to the first specific device end pin, and the signal output end is connected to the second specific device end pin;
    when the data storage device is inserted into the host end connector of the host via the device end connector, the first specific device end pin is electrically connected to the first specific host end pin, the second specific device end pin is electrically connected to the second specific host end pin, and a closed loop is formed between the signal output end, the second specific device end pin, the second specific host end pin, the first specific host end pin, the first specific device end pin, and the signal input end;
    if the trigger transmits a first level signal from the signal output end and receives the first level signal at the signal input end, a level state at the signal input end is a first level state, the trigger operates in a normal mode based on the first level state at the signal input end so as to prohibit the physical-destruction activating signal to be transmitted to the backup power module; and
    if the trigger transmits the first level signal from the signal output end but does not receive the first level signal at the signal input end, the level state at the signal input end changes from the first level state to a second level state, and the trigger operates in a trigger mode based on the second level state at the signal input end to transmit the physical-destruction activating signal to the backup module.

2. The data storage device according to claim 1, wherein the backup power module comprises a battery set, a switch, and a boost converter, the trigger is connected to the battery set and the switch, and the boost converter is connected between the switch and the flash memories; wherein when the trigger transmits the physical-destruction activating signal to the backup power module, the switch is turned on according to the physical-destruction activating signal so that a discharge energy from the battery set is transmitted to the boost converter via the switch in turned on, and the boost converter outputs the high voltage to the flash memories.

3. The data storage device according to claim 1, wherein the data storage device is powered by a system power and the backup power module is charged by the system power.

4. The data storage device according to claim 3, wherein the backup power module supplies power to the trigger when the system power is powered off.

5. The data storage device according to claim 1, wherein the trigger is a flip-flop.

6. The data storage device according to claim 1, wherein the trigger is preset to a disabled state, wherein when the host transmits a security-protection activating command to the data storage device, the controller of the data storage device enables the trigger according to the security-protection activating command to activate the self-destruction function of the data storage device.

7. A data storage device having self-destruction function, the data storage device comprising:
    a controller;
    a plurality of flash memories;
    a device end connector, wherein the data storage device is inserted into a host end connector of a host via the device end connector;
    a trigger; and
    a backup power module, wherein the controller is connected to the flash memories, the device end connector, the trigger, and the backup power module, respectively;
    wherein when the device end connector of the data storage device is pulled out from the host end connector of the host, the trigger is triggered and transmits a physical-destruction activating signal to the backup power module, and the backup power module outputs a high voltage to the flash memories according to the physical-destruction activating signal to destroy the flash memories;

wherein the host end connector of the host comprises a first specific host end pin that is grounded, the device end connector of the data storage device comprises a first specific device end pin corresponding to the first specific host end pin, the trigger is a trigger triggered by a signal with high-level and comprises a signal input end connected to a power supply and the first device end pin, respectively;

when the data storage device is inserted into the host end connector via the device end connector, the signal input end is grounded via the first specific device end pin and the first specific host end pin, a level state at the signal input end is pulled down by the grounding to a low-level state, and the trigger operates in a normal mode based on the low-level state at the signal input end so that the trigger is prohibited to transmit the physical-destruction activating signal to the backup power module; and when the device end connector of the data storage device is pulled out from the host end connector of the host, the level state at the signal input end is pulled up by the power supply to a high-level state, and the trigger operates in a trigger mode based on the high-level state at the signal input end so that the trigger will transmit the physical-destruction activating signal to the backup power module.

8. A data storage device having self-destruction function, the data storage device comprising:
a controller;
a plurality of flash memories;
a device end connector, wherein the data storage device is inserted into a host end connector of a host via the device end connector;
a trigger; and
a backup power module, wherein the controller is connected to the flash memories, the device end connector, the trigger, and the backup power module, respectively;
wherein when the device end connector of the data storage device is pulled out from the host end connector of the host, the trigger is triggered and transmits a physical-destruction activating signal to the backup power module, and the backup power module outputs a high voltage to the flash memories according to the physical-destruction activating signal to destroy the flash memories;
further comprising a micro switch that is disposed beside the device end connector, and comprising a switch lever, a common terminal, a normally closed terminal, and a normally open terminal; wherein the host further comprises a baffle board disposed beside the host end connector, the trigger is a trigger triggered by a signal with low-level and comprises a signal input end, the common terminal is connected to the signal input end and a power supply, the normally closed terminal is grounded, the normally open terminal is open circuit;
when the device end connector of the data storage device is inserted into the host end connector of the host, the switch lever of the microswitch is pushed against the baffle board and therefore is pressed, the common terminal is switched to be connected to the normally open terminal, a level state at the signal input end is pulled up by the power supply to a high-level state, and the trigger operates in a normal mode based on the high-level state at the signal input end so that the trigger is prohibited to transmit the physical-destruction activating signal to the backup power module; and when the device end connector of the data storage device is pulled out from the host end connector of the host, the switch lever is released from the baffle board such that the common terminal is switched to be connected to the normally closed terminal, the signal input end is grounded via the common terminal and the normally closed terminal, the level state at the signal input end is pulled down by the grounding to a low-level state, the trigger operates in a trigger mode based on the low-level state at the signal input end so that the trigger transmits the physical-destruction activating signal to the backup power module.

9. A data storage device having self-destruction function, the data storage device comprising:
a controller;
a plurality of flash memories;
a device end connector, wherein the data storage device is inserted into a host end connector of a host via the device end connector;
a trigger; and
a backup power module, wherein the controller is connected to the flash memories, the device end connector, the trigger, and the backup power module, respectively;
wherein when the device end connector of the data storage device is pulled out from the host end connector of the host, the trigger is triggered and transmits a physical-destruction activating signal to the backup power module, and the backup power module outputs a high voltage to the flash memories according to the physical-destruction activating signal to destroy the flash memories;
further comprising a microswitch that is disposed beside the device end connector, and comprising a switch lever, a common terminal, a normally closed terminal, and a normally open terminal; wherein the host further comprises a baffle board disposed beside the host end connector, the trigger comprises a signal input end and is a trigger triggered by a signal with high-level, the common terminal is connected to the signal input end and a power supply, the normally closed terminal is open circuit, and the normally open terminal is grounded;
when the device end connector is inserted into the host end connector of the host, the switch lever of the microswitch pushes against the baffle board and therefore is pressed, the common terminal is switched to be connected to the normally open terminal, the signal input end is grounded via the common terminal and the normally open terminal, a level state at the signal input end is pulled down by the grounding to a low-level state, and the trigger operates in a normal mode based on the low-level state at the signal input end so that the trigger is prohibited to transmit the physical-destruction activating signal to the backup power module; and
when the device end connector of the data storage device is pulled out from the host end connector of the host, the switch lever is released from the baffle board, the common terminal is switched to be connected to the normally closed terminal, the level state at the signal input end is pulled up by the power supply to a high-level state, and the trigger operates in a trigger mode based on the high-level state at the signal input end so that the trigger transmits the physical-destruction activating signal to the backup power module.

10. A data storage device having self-destruction function, the data storage device comprising:
a controller;
a plurality of flash memories;
a device end connector, wherein the data storage device is inserted into a host end connector of a host via the device end connector;
a trigger; and
a backup power module, wherein the controller is connected to the flash memories, the device end connector, the trigger, and the backup power module, respectively;
wherein when the device end connector of the data storage device is pulled out from the host end connector of the host, the trigger is triggered and transmits a physical-destruction activating signal to the backup power module, and the backup power module outputs a high voltage to the flash memories according to the physical-destruction activating signal to destroy the flash memories;
wherein the data storage device is disposed in an external box, the external box comprises an external connector electrically connected to the device end connector of the data storage device, the host comprises a slot in which the host end connector is disposed on a bottom plate thereof, the data storage device is inserted into the host end connector of the slot of the host via the external connector of the external box; the data storage device further comprises a microswitch that is disposed beside the external connector and comprising a switch lever, a common terminal, a normally closed terminal, and a normally open terminal; wherein the switch lever of the microswitch protrudes out from a case of the external box, the trigger is a trigger triggered by a signal with low-level and comprises a signal input end, the common terminal is connected to the signal input end and a power supply, the normally closed terminal is grounded, and the normally open terminal is open circuit;
when the external box is pushed into the slot of the host and the external connector of the external box is inserted into the host device connector, the switch lever of the microswitch pushes against the bottom plate of the slot and therefore is pressed, the common terminal is switched to be connected to the normally open terminal, a level state at the signal input end is pulled up by the power supply to a high-level state, and the trigger operates in a normal mode based on the high-level state at the signal input end so that the trigger is prohibited to transmit the physical-destruction activating signal to the backup power module; and
when the external connector of the external box is pulled out from the host end connector in the slot of the host, the switch lever is released from the bottom plate of the slot, the common terminal is switched to be connected to the normally closed terminal, the signal input end is grounded via the common terminal and the normally closed terminal, the level state at the signal input end is pulled down to a low-level state, and, the trigger operates in a trigger mode based on the low-level state at the signal input end so that the trigger transmits the physical-destruction activating signal to the backup power module.

11. A data storage device having self-destruction function, the data storage device comprising:
a controller;
a plurality of flash memories;
a device end connector, wherein the data storage device is inserted into a host end connector of a host via the device end connector;
a trigger; and
a backup power module, wherein the controller is connected to the flash memories, the device end connector, the trigger, and the backup power module, respectively;
wherein when the device end connector of the data storage device is pulled out from the host end connector of the host, the trigger is triggered and transmits a physical-destruction activating signal to the backup power module, and the backup power module outputs a high voltage to the flash memories according to the physical-destruction activating signal to destroy the flash memories;
wherein the data storage device is disposed in an external box, the external box comprises an external connector electrically connected to the device end connector of the data storage device, the host comprises a slot in which the host end connector is disposed on a bottom plate thereof, the data storage device is inserted into the host end connector of the slot of the host via the external connector of the external box, the data storage device further comprises a microswitch that is disposed beside the external connector and comprising a switch lever, a common terminal, a normally closed terminal, and a normally open terminal; wherein the switch lever of the microswitch protrudes out from a case of the external box, the trigger is a trigger triggered by a signal with high-level and comprises a signal input end, the common terminal is connected to the signal input end and a power supply, the normally closed terminal is open circuit, and the normally open terminal is grounded;
when the external box is pushed into the slot of the host and the external connector of the external box is inserted into the host end connector, the switch lever of the microswitch pushes against the bottom plate of the slot and therefore is pressed, the common terminal is switched to be connected to the normally open terminal, the signal input end is grounded via the common terminal and the normally open terminal, the level state at the signal input end is pulled down by the grounding to a low-level state, and the trigger operates in a normal mode based on the low-level state at the signal input end so that the trigger is prohibited to transmit the physical-destruction activating signal to the backup power module; and
when the external connector of the external box is pulled out from the host end connector in the slot of the host, the switch lever is released from the bottom plate in the slot, the common terminal is switched to be connected to the normally closed terminal, the level state at the signal input end is pulled up by the power supply to a high-level state, and the trigger operates in a trigger mode based on the high-level state at the signal input end so that the trigger will transmit the physical-destruction activating signal to the backup power module.

* * * * *